417-554

BEST AVAILABLE COPY

J. T. WHIPPLE. Reis. of 74,738.

Pump for Deep Wells.

No. 6,477. Reissued June 1, 1875.

Witnesses:

L. S. Pratt

F. Mason Gaegler

Inventor:

James T. Whipple.

by Sherburne & Co

Attorneys

UNITED STATES PATENT OFFICE.

JAMES T. WHIPPLE, OF OAK PARK, ILLINOIS.

IMPROVEMENT IN PUMPS FOR DEEP WELLS.

Specification forming part of Letters Patent No. 74,738, dated February 18, 1868; reissue No. 6,477, dated June 1, 1875; application filed November 30, 1874.

*To all whom it may concern:*

Be it known that I, JAMES T. WHIPPLE, of Oak Park, in the county of Cook and State of Illinois, but formerly of Chicago, in said county and State, have invented certain new and useful Improvements in Deep-Well Pumps; and I do hereby declare the following to be a full, clear, and exact description thereof, which will enable others skilled in the art to which it appertains to make and use the same, reference being had to the accompanying drawing, forming part of this specification, in which—

Figure 1:
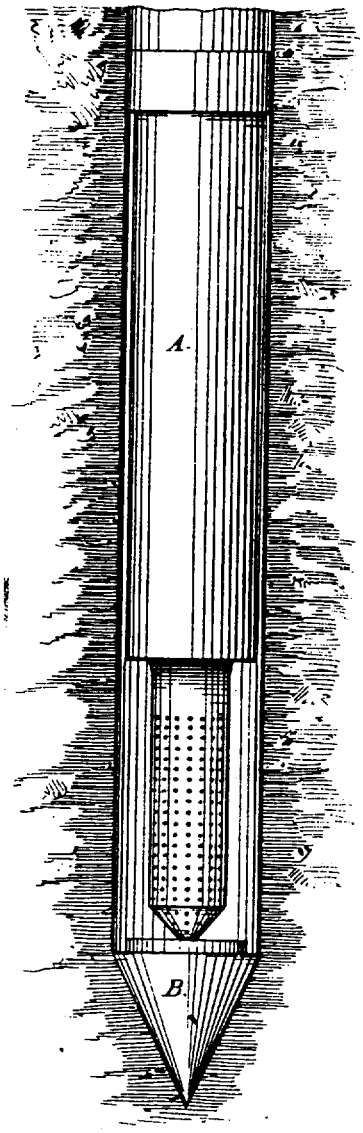
Figure 2:
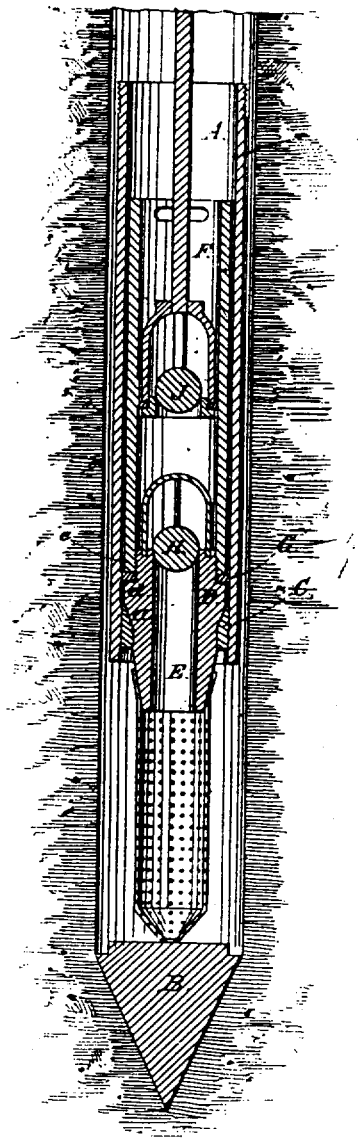

Figure 1 is an elevation of a portion of the tube containing my said improvement, with point detached, showing the filter extending below the tube; and Fig. 2 is a vertical central section of the same, cutting the parts constituting my said improvement through the center.

Similar letters of reference indicate like parts in both figures of the drawing.

My invention relates to that class of deep-well pumps used in driven or bored wells; and its object is to provide an arrangement of valves combined with the filter, which may be introduced into the cavity of the tube, after the latter has been driven into place or removed therefrom, at will, without withdrawing the tube. To that end it consists in providing the upper end of the filter with a valve-seat having an elongated conical base, to which the filter is attached, whereby the latter may extend into the water course below the end of the tube; further, in combination with the valve-seat, having an elongated base, of an annular collar, adapted to pass through the cavity of the tube and receive the base of the valve-seat; further, in a flexible packing arranged between the periphery of the valve-seat and inner surface of the tube below the seat, whereby the space between the seat and the wall of the tube is tightly closed; further, in combination with said valve-seat, a cylinder arranged to receive the operating-valves, and adapted to pass through the cavity in the tube, and attached to the valve-seat above the packing, all of which will be more fully understood by the following description and claims:

In the accompanying drawing, A represents the main tube, which is constructed of wrought-metal pipe in the usual manner. C is an adjustable ring or collar, which is adapted to pass through the cavity of the tube and admit of being forced downward within the same to any desired point where it is to be located. D is the valve-seat, provided with an elongated conical base, adapted to pass through the collar, both being correspondingly screw-threaded, as shown at *a*. The lower end of this valve-seat is so arranged as to allow the filter, which extends below the end of the tube A into the water-course, to be firmly attached thereto, and is provided with a cavity, E, corresponding with the cavity in the filter, through which the water flows upward into the tube. The upper end of this base or valve-seat is made less in diameter than its central portion, forming a shoulder, *d*, below the seat proper, and is screw-threaded externally, as shown at *e*, to receive the lower end of cylinder F. This cylinder is also adapted to pass loosely through the cavity of the tube, which admits of its being removed when desired. G is a flexible packing, which is secured around the threaded portion of the base, between shoulder *d* and the lower end of the cylinder. The material from which this packing is formed is such as to expand laterally against the inner surface of the tube when compressed between the shoulder *d* and the end of the cylinder as the same are screwed together. This packing tightly closes the space between the periphery of the base and the inner surface of the tube below the valve-seat, rendering the same water-tight, which is necessary for the effectual working of the valves. H is the ordinary globe or other suitable check valve, which is arranged upon the seat D in the usual manner. J is the common suction or lift valve, which is secured within the cavity of the cylinder. This valve is attached to the rod *f*, and operated by the pump-handle in the usual manner.

My invention is arranged for operation in the following manner: The main tube A is driven into the ground to the requisite depth, in the usual manner. Collar C is then introduced into the cavity of the tube and located at or near the lower end of the same. The tube is then drawn upward a slight distance from the point. The check-valve and seat D, having its packing G arranged on the shoulder *d*, and the filter attached to the elongated base, is then introduced into the cavity of the pipe and screwed into the collar, allowing the filter to extend below the end of the main tube. Cylinder F is then introduced into the cavity of the tube and screwed to the base of the valve-seat onto the packing, forcing the latter outward against the inner surface of the tube. Valve J is then arranged in the cylinder and attached to the pump-handle by means of rod *f*, completing the pump.

The advantages of my improvement are several: First, the tube can be driven into place and the filter and operating parts of the pump introduced into the tube after it is adjusted; second, the valves and filter can be removed from the tube without moving the latter, when desired, should the same need repairing; third, it entirely obviates the necessity of excavating the earth for the purpose of setting the valves below the surface of the ground, as is the case when the ordinary pump is used in deep wells.

Having thus described my invention, I do not claim the filter extending below the main tube, for I am aware that such is shown in the patent to Duck and Whipple; but

What I do claim is—

1. In combination with the filter extending below the main tube, the valve-seat D, when connected to the filter and arranged to admit of being withdrawn through the tube, as specified.

2. In combination with valve-seat D, the adjustable ring or collar C, adapted to pass through the cavity of the tube, whereby the seat is secured in position, as specified.

3. The flexible packing G, arranged to close the space between the periphery of the base of the valve-seat and the inner surface of the tube below the seat, as and for the purpose set forth.

4. In combination with the valve-seat D, the cylinder F, arranged to receive the valves and compress the packing G between its end and the shoulder of the valve-seat, as specified.

JAMES T. WHIPPLE.

Witnesses:

JOHN H. WHIPPLE,

N. H. SHERBURNE.